US008892870B2

(12) United States Patent
Pedlow, Jr. et al.

(10) Patent No.: US 8,892,870 B2
(45) Date of Patent: Nov. 18, 2014

(54) DIGITAL RIGHTS MANAGEMENT FOR LIVE STREAMING BASED ON TRUSTED RELATIONSHIPS

(75) Inventors: Leo Mark Pedlow, Jr., Ramona, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 275 days.

(21) Appl. No.: 13/418,246

(22) Filed: Mar. 12, 2012

(65) Prior Publication Data
US 2013/0238896 A1   Sep. 12, 2013

(51) Int. Cl.
*H04L 29/06* (2006.01)
(52) U.S. Cl.
USPC ........................................... 713/156
(58) Field of Classification Search
CPC ....................................... G06F 21/00
USPC ............... 705/59, 50, 51, 901, 902, 904, 911; 380/201, 202, 203, 204; 713/156
See application file for complete search history.

(56) References Cited

U.S. PATENT DOCUMENTS

| 8,429,081 | B1 * | 4/2013 | Dronamraju et al. ........... 705/59 |
| 2005/0278259 | A1 | 12/2005 | Gunaseelan et al. |
| 2006/0112188 | A1 | 5/2006 | Albanese et al. |
| 2007/0107019 | A1 | 5/2007 | Romano et al. |
| 2009/0235329 | A1 | 9/2009 | Chavez et al. |
| 2011/0047566 | A1 | 2/2011 | Matuchniak et al. |
| 2011/0231660 | A1 | 9/2011 | Kanungo |
| 2011/0246616 | A1 | 10/2011 | Ronca et al. |
| 2011/0299586 | A1 | 12/2011 | Odlund et al. |
| 2011/0302618 | A1 | 12/2011 | Odlund et al. |

FOREIGN PATENT DOCUMENTS

WO   2011/020088 A1   2/2011

OTHER PUBLICATIONS

Jacobs, editor, "URIs, Addressability, and the use of HTTP GET and POST," W3, TAG Finding dated Mar. 21, 2004, accessed at http://www.w3.org/2001/tag/doc/whenToUseGet.html, 11 pages.

* cited by examiner

*Primary Examiner* — Beemnet Dada
*Assistant Examiner* — John B King
(74) *Attorney, Agent, or Firm* — Procopio, Cory, Hargreaves & Savitch LLP

(57) ABSTRACT

Managing digital rights of content based on trusted relationships including: tagging the content as using encryption and specifying a retrieval method that is used to request a decryption key so that the content is live streamed to a client device a client device; transmitting an affiliation token to a trusted agent, wherein the trusted agent relays the affiliation token onto the client device based on requirement and identifier of the client device; receiving a request from the client device for the decryption key, which includes a value from the affiliation token to identify the trusted relationships; and verifying the request and providing the decryption key to the client device, wherein the client device uses the decryption key to decrypt the live streaming content for playback. Keywords include digital rights management and trusted relationship.

19 Claims, 4 Drawing Sheets

DIGITAL RIGHTS MANAGEMENT FOR LIVE STREAMING BASED ON TRUSTED RELATIONSHIPS

BACKGROUND

1. Field of the Invention

The present invention relates to digital rights management for live streaming, and more specifically, to digital rights management for live streaming based on trusted relationships.

2. Background

In some systems that provide live streaming content to personal computers or IP-enabled devices such as IPTV, Blu-ray disc player, and Home Audio devices, any device can access encrypted content and a public key to decrypt the content because the uniform resource identifier (URI) and/or uniform resource locator (URL) to the encrypted content and the key are listed in the live streaming playlist. These systems lack the methodology to manage access rights for encrypted content based on an established relationship. Further, these systems do not provide a way for a service provider to specify the use of content encryption and an appropriate hypertext transfer protocol (HTTP) method to acquire the decryption key and/or live streaming content.

SUMMARY

The present invention provides for managing digital rights of content based on trusted relationships.

In one implementation, a method of managing digital rights of content based on trusted relationships is disclosed. The method includes: tagging the content as using encryption and specifying a retrieval method that is used to request a decryption key by a client device; transmitting an affiliation token to a trusted agent, wherein the trusted agent relays the affiliation token onto the client device based on requirement and identifier of the client device; receiving a request from the client device for the decryption key, which includes the affiliation token to identify the trusted relationships; and verifying the request and providing the decryption key to the client device, wherein the client device uses the decryption key to decrypt the live streaming content for playback.

In another implementation, a method of managing digital rights of content based on trusted relationships is disclosed. The method includes: receiving an affiliation token from a service provider; reviewing device requirement and identifier of a client device to determine whether and how to transmit the affiliation token to the client device; transmitting the affiliation token to the client device, wherein once the client device receives the affiliation token, the client device prepares and transmits an appropriate request to a service provider to receive a decryption key, and wherein the client device uses the decryption key to decrypt and playback the live streaming content.

In another implementation, a digital rights management system for managing content based on existing relationships is disclosed. The system includes: a service provider configured to enable live streaming of the content to a client device, the service provider issuing an affiliation token upon verification of the existing relationships; a trusted agent configured to receive the affiliation token from the service provider and to relay the affiliation token to the client device once requirement and identifier of the client device are acquired based on the existing relationship between the trusted agent and the client device, wherein the affiliation token transmitted from the trusted agent to the client device enables the client device to obtain a decryption key to decrypt and playback the live streaming content.

In yet another implementation, a non-transitory storage medium storing a computer program to manage digital rights of content based on trusted relationships is disclosed. The computer program includes executable instructions that cause a computer to: tag the content as using encryption and specifying a retrieval method that is used to request a decryption key by a client device; transmit an affiliation token to a trusted agent, wherein the trusted agent relays the affiliation token onto the client device based on requirement and identifier of the client device; receive a request from the client device for the decryption key, which includes the affiliation token to identify the trusted relationships; and verify the request and providing the decryption key to the client device, wherein the client device uses the decryption key to decrypt the live streaming content for a playback.

Other features and advantages of the present invention will become more readily apparent to those of ordinary skill in the art after reviewing the following detailed description and accompanying drawings.

DETAILED DESCRIPTION

Figure 1:
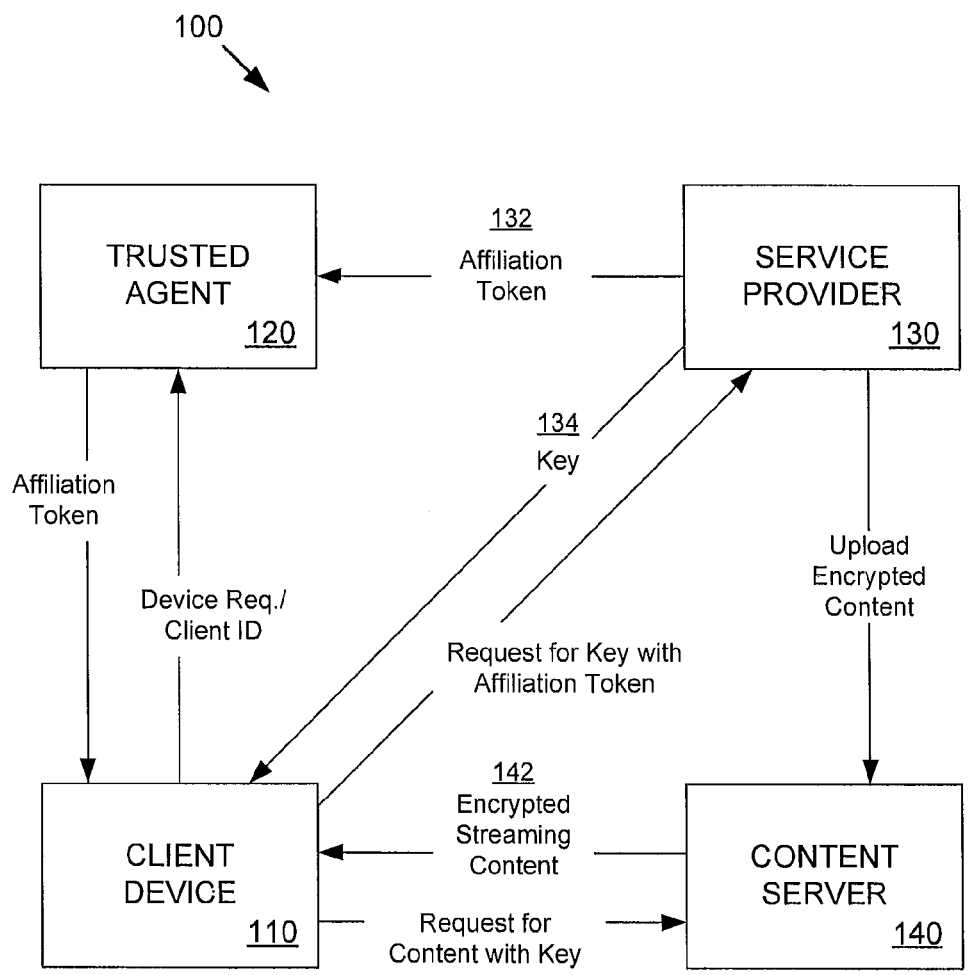
FIG. 1 is a functional block diagram of a digital rights management (DRM) system in accordance with one implementation of the present invention.

Certain implementations as disclosed herein provide for digital rights management (DRM) of live streaming content through a trusted relationship and specification of an appropriate hypertext transfer protocol (HTTP) method to acquire the decryption key and/or live streaming content. Although the HTTP protocol is mentioned as one protocol for acquiring the live streaming content, any protocol that supports live streaming content delivery such as Real Time Streaming Protocol (RTSP), Microsoft Live Smooth Streaming, etc., can be used. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

As discussed above, in some systems that provide live streaming content to a client device such as a Blu-ray IPTV device, the client device can access encrypted content and a public key to decrypt the content. However, these systems often do not address or lack existing trusted relationships among the client device, the server streaming the live content, and the service provider providing the content to the client device.

In one implementation, a trusted agent, which has a trusted relationship with a service provider and an existing relationship with a client, is introduced to communicate with both the service provider and the client device to address and solve the above-discussed issues. Toward that goal, an affiliation token, which represents a linkage of trust between the trusted agent and the service provider providing the encrypted content, can be used as a token of trust.

The service provider can also specify through the affiliation token what method the client device must use to acquire the live streaming content. For example, the affiliation token can specify that obtaining the live streaming content involves just retrieving it from the streaming server using an HTTP 'GET' method or involves other actions such as submitting, storing, or updating data, or ordering a product, or sending an e-mail using an HTTP 'POST' method. Thus, the use of a correct method (as specified in the affiliation token) to obtain the live streaming content adds a layer of trust for the service provider that only the authorized client devices will access the live streaming content from the streaming server.

In another implementation, the digital rights management of the live streaming content involves a method in which a service provider tags the content (e.g., using extensible markup language (XML) tags) as using encryption and specifying an HTTP (e.g., an HTTP 'GET' or HTTP 'POST') method that can be used to request a decryption key by a client device so that the content can be live streamed to the client device. As discussed above, the HTTP method used to acquire live streaming content can be conveyed to the client device through the use of an affiliation token. The client device that supports live streaming recognizes the tags, and prepares an appropriate request with the affiliation token to identify its relationship to the service provider. In response, the service provider verifies the request and provides the decryption key. The verification of the request from the client device involves validating the client device through the affiliation token value. The client device then uses the decryption key to decrypt the live streaming content and start the playback.

The above-described configuration of the digital rights management of the live streaming content is made possible because the configuration is based on existing trusted relationships between the service provider and the trusted agent and between the trusted agent and the client device. Because of the existing relationship between the trusted agent and the client device, the trusted agent has information about the client device which would allow the trusted agent to relay the affiliation token issued by the service provider to the client device. That is, based on the device requirement and the identifier of the client device, the trusted agent determines whether or not to transmit the affiliation token to the client device. In one variation, the trusted agent can attach further information about the client device/client to the affiliation token so that the service provider can use the information to enhance other business opportunities with the client. In another variation, the further information embedded into the affiliation token by the trusted agent can be requested or selected by the client rather than having the trusted agent pick and choose the further information to send to the service provider along with the affiliation token.

FIG. 1 is a functional block diagram of a digital rights management (DRM) system 100 in accordance with one implementation of the present invention. In the illustrated implementation of FIG. 1, the DRM system 100 includes a client device 110, a trusted agent 120, a service provider 130, and a streaming content server 140. The DRM system 100 is configured to provide content, which was uploaded by the service provider 130 to the streaming content server 140, live streamed to the client device 110. Further, the digital rights of the live streaming content are managed by the service provider 130 by using the existing relationships among the client device 110, the trusted agent 120, and the service provider 130. That is, digital rights management of live streaming content is made possible because the configuration of the DRM system 100 is based on existing trusted relationships between the service provider 130 and the trusted agent 120 and between the trusted agent 120 and the client device 110.

Because of the trusted relationship between the trusted agent 120 and the service provider 130, the service provider 130 issues an affiliation token 132 to the client device 110 through the trusted agent 120. Further, because of the existing relationship between the trusted agent 120 and the client device 110, the trusted agent 120 has information about the client device 110 which would allow the trusted agent 120 to relay the affiliation token 132 issued by the service provider 130 to the client device 110. That is, based on the device requirement and the identifier of the client device 110, the trusted agent 120 determines whether and how to transmit the affiliation token 132 to the client device 110.

In the illustrated implementation of FIG. 1, the service provider 130 tags the content as using encryption and specifying an HTTP method that can be used to request a decryption key so that the content can be live streamed to the client device 110. As described above, the HTTP method used to request the decryption key can be conveyed to the client device 110 through the use of an affiliation token 132. Furthermore, the encrypted content is uploaded to the live streaming content server 140 by the service provider 130. The affiliation token 132 is then transmitted to the trusted agent 120. As mentioned above, based on the information the trusted agent 120 has about the client device 110, such as device requirement and identifier, the trusted agent 120 can determine whether and how to transmit the affiliation token 132 received from the service provider 130 to the client device 110. The client device 110 that supports live streaming would recognize the tags, and would prepare an appropriate request for a decryption key 134 with a value from the affiliation token 132 to identify its relationship to the service provider 130. In response, the service provider 130 verifies the request and provides the decryption key 134. The verification of the request from the client device 110 involves validating the client device 110 through the affiliation token value. The client device 110 then uses the decryption key 134 to decrypt the encrypted live streaming content 142 and start the playback.

Figure 2A:
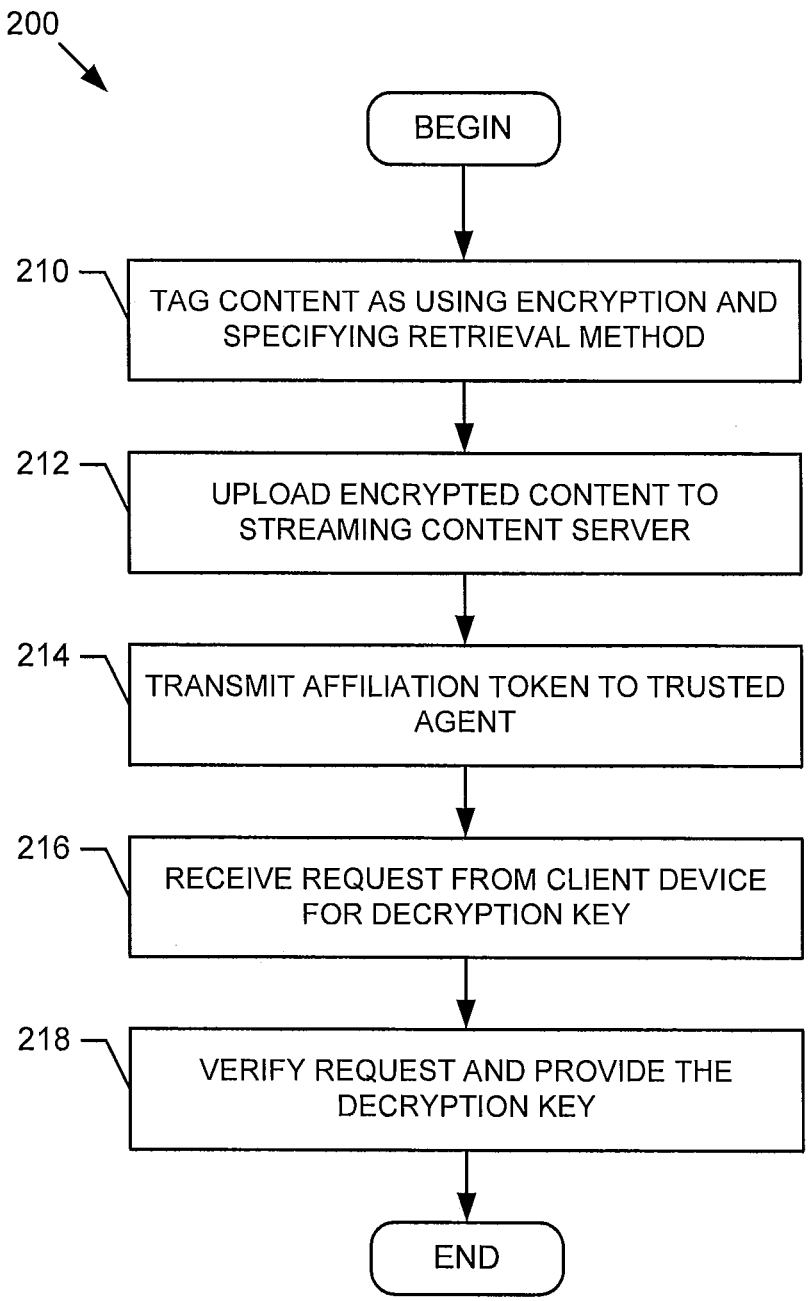
FIG. 2A is a flowchart illustrating a method of managing digital rights of live streaming content based on trusted relationships in accordance with one implementation of the present invention.

FIG. 2A is a flowchart 200 illustrating a method of managing digital rights of live streaming content based on trusted relationships in accordance with one implementation of the present invention. The digital right management also includes specification of a required hypertext transfer protocol (HTTP) method to acquire the live streaming content. The illustrated implementation of FIG. 2A shows the digital rights management of live streaming content by a service provider (e.g., reference 130 shown in FIG. 1).

In the illustrated implementation of FIG. 2A, the content is tagged, at box 210, by the service provider as using encryption and specifying a retrieval method (e.g., an HTTP method) that can be used to request a decryption key by a client device so that the content can be live streamed to the client device. In one implementation, the retrieval method used to request a decryption key can be conveyed to the client device through the use of an affiliation token. The encrypted content is uploaded, at box 212, to a live streaming content server by the service provider. The affiliation token is then transmitted, at box 214, to a trusted agent. Based on the information the trusted agent has about the client device, such as device requirement and identifier, the trusted agent can determine whether and how to transmit the affiliation token received from the service provider to the client device. The client device that supports live streaming would recognize the tags, and would prepare an appropriate request to the service provider. Thus, at box 216, the service provider receives a request from the client device for a decryption key, which includes a value from the affiliation token to identify the relationship of the client device to the service provider through the trusted agent.

In response, the service provider verifies the request and provides the decryption key, at box 218. The verification of the request from the client device involves validating the client device using the affiliation token, as well as confirming that the client device is using a correct retrieval method specified in the affiliation token. The client device can then use the decryption key to decrypt the encrypted live streaming content from the live streaming server and start the playback.

Figure 2B:
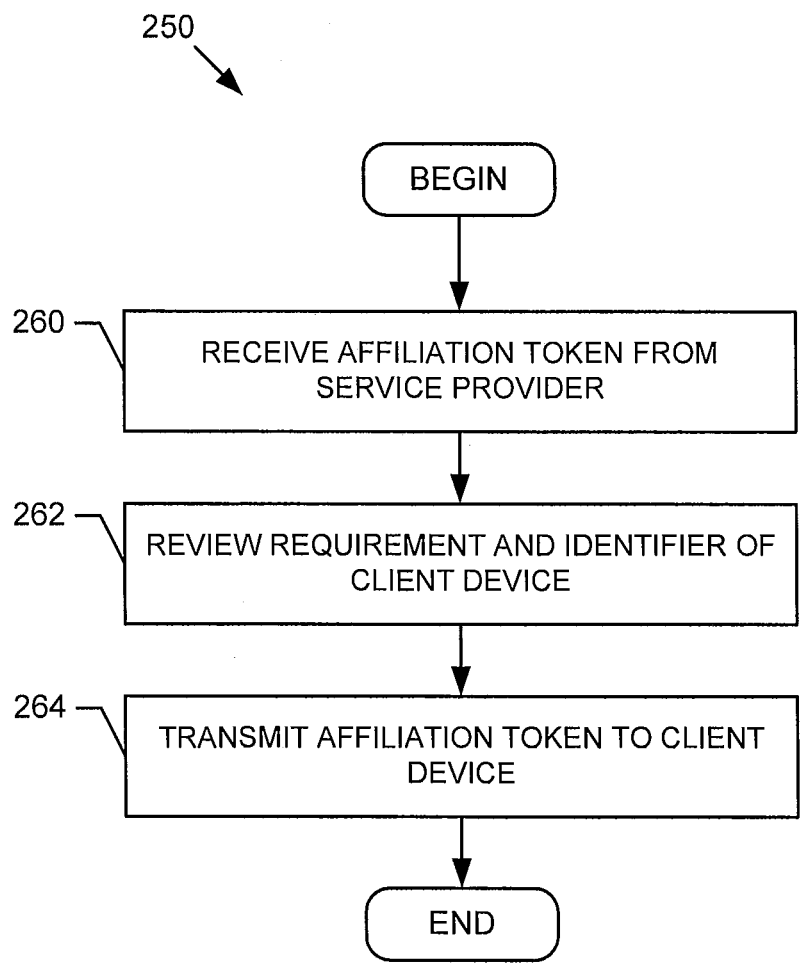
FIG. 2B is another flowchart illustrating a method of managing digital rights of live streaming content based on trusted relationships in accordance with another implementation of the present invention.

FIG. 2B is another flowchart 250 illustrating a method of managing digital rights of live streaming content based on trusted relationships in accordance with another implementation of the present invention. The digital right management also includes specification of a required hypertext transfer protocol (HTTP) method to request a decryption key by a client device so that the live streaming content can be acquired by the client device. The illustrated implementation of FIG. 2B shows the digital rights management of live streaming content by a trusted agent (e.g., reference 120 shown in FIG. 1).

In the illustrated implementation of FIG. 2B, an affiliation token is received, at box 260, from a service provider by the trusted agent. In one implementation, the affiliation token will be used by a client device to validate itself to the service provider and find out the retrieval method (e.g., an HTTP method) that must be used to receive the content at the client device. The trusted agent then reviews device requirement and identifier of the client device, at box 262, to determine whether and how to transmit the affiliation token to the client device. At box 264, the trusted agent transmits the affiliation token to the client device. Once the client device receives the affiliation token from the trusted agent, the client device that supports live streaming prepares an appropriate request to the service provider to receive the decryption key so that the client device can then use the decryption key to decrypt the live streaming content and start the playback. The request includes an affiliation token to identify the relationship of the client device to the service provider through the trusted agent.

Figure 3A:
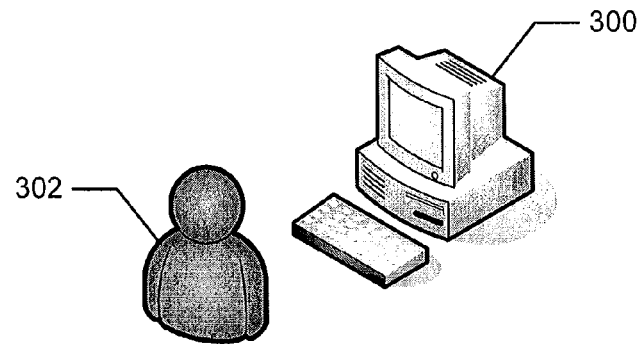
FIG. 3A illustrates a representation of a computer system and a user.

FIG. 3A illustrates a representation of a computer system 300 and a user 302. The user such as a service provider operator 302 uses the computer system 300 to provide digital rights management of live streaming content. The computer system can be configured as a service provider (e.g., reference 130 in FIG. 1) or as a trusted agent (e.g., reference 120 in FIG. 1).

Figure 3B:
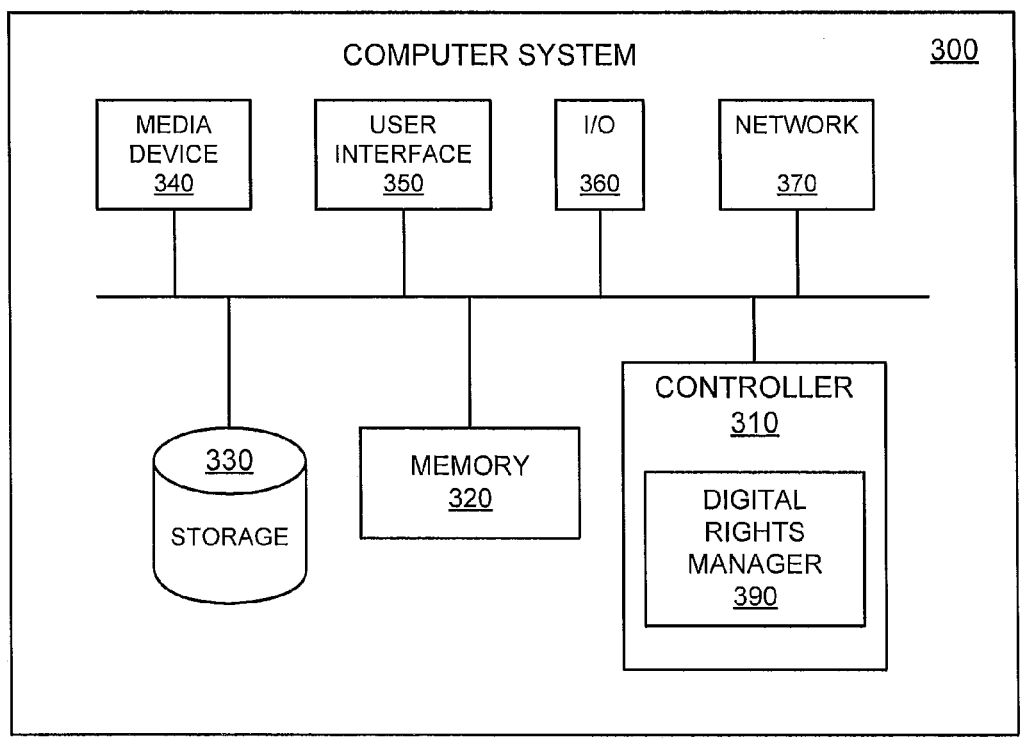
FIG. 3B is a functional block diagram illustrating the computer system hosting the digital rights manager.

FIG. 3B is a functional block diagram illustrating the computer system 300 hosting the digital rights manager 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the digital rights manager 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Non-transitory storage 330 stores data for use by other components of the computer system 300, such as for storing data used by the remote device servicing manager 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user 302 and presenting information to the agent 302. In one implementation, the user interface 350 includes a keyboard, a mouse, audio speakers, and a display. The controller 310 uses input from the agent 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the specification shows a separate live streaming content server (e.g., reference 140 of FIG. 1), the server can be configured to be co-located with or contained within the service provider (e.g., reference 130 of FIG. 1). Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method comprising:
managing digital rights of content based on trusted relationships comprising:
a) tagging the content as using encryption;

b) specifying a retrieval method that is used to acquire live streaming content to be delivered to a client device;
c) transmitting an affiliation token to a trusted agent,
1) wherein the affiliation token represents a linkage of trust between the trusted agent and a service provider,
2) wherein the trusted agent attaches further information about the client device including an identifier to the affiliation token, wherein the service provider can use the information to enhance other business opportunities with a client, and
3) wherein the trusted agent relays the affiliation token onto the client device based on requirement and the identifier of the client device;
d) receiving a request from the client device for a decryption key, which includes the affiliation token to identify the trusted relationships; and
e) verifying the request and providing the decryption key to the client device, wherein the client device uses the decryption key to decrypt the live streaming content for playback.

2. The method of claim 1, wherein the retrieval method comprises
a required or mandated hypertext transfer protocol (HTTP) method to acquire the decryption key so that the content is live streamed to the client device.

3. The method of claim 1, wherein the retrieval method used to live stream the content is conveyed to the client device through the affiliation token.

4. The method of claim 1, further comprising
uploading the content to a content server for live streaming of the content to the client device.

5. The method of claim 1, wherein verifying the request comprises
validating the client device through the affiliation token value.

6. The method of claim 1, wherein verifying the request comprises
confirming that the client device is using the retrieval method as specified in the affiliation token.

7. A method comprising:
managing digital rights of live streaming content based on trusted relationships comprising:
a) receiving an affiliation token from a service provider,
b) wherein the affiliation token represents a linkage of trust between the trusted agent and a service provider;
c) reviewing device requirement and identifier of a client device to determine whether and how to transmit the affiliation token to the client device;
d) attaching further information about the client device including an identifier to the affiliation token, wherein the service provider can use the information to enhance other business opportunities with a client; and
e) transmitting the affiliation token to the client device, wherein once the client device receives the affiliation token, the client device prepares and transmits an appropriate request to a service provider to receive a decryption key, and wherein the client device uses the decryption key to decrypt and playback the live streaming content.

8. The method of claim 7, wherein the affiliation token includes a specification for a retrieval method that is used to live stream the content to the client device.

9. The method of claim 8, wherein the retrieval method comprises
an appropriate hypertext transfer protocol (HTTP) method to acquire the decryption key so that the content is live streamed to the client device.

10. The method of claim 7, wherein the affiliation token is used by the client device to validate itself to the service provider.

11. A digital rights management system for managing content based on existing relationships, comprising:
a service provider configured to enable live streaming of the content to a client device, the service provider issuing an affiliation token upon verification of the existing relationships;
a trusted agent configured to receive the affiliation token from the service provider, to attach further information about the client device including an identifier to the affiliation token, wherein the service provider can use the information to enhance other business opportunities with a client, and to relay the affiliation token to the client device once requirement and the identifier of the client device are acquired based on the existing relationship between the trusted agent and the client device,
wherein the affiliation token represents a linkage of trust between the trusted agent and the service provider,
wherein the affiliation token transmitted from the trusted agent to the client device enables the client device to obtain a decryption key to decrypt and playback the live streaming content.

12. The system of claim 11, wherein the affiliation token includes a specification for a retrieval method that is used to live stream the content to the client device.

13. The system of claim 12, wherein the retrieval method comprises
a required hypertext transfer protocol (HTTP) method to acquire the decryption key so that the content is live streamed to the client device.

14. The system of claim 11, further comprising
a content server configured to receive the content from the service provider and store the content for live streaming to the client device upon request from the client device.

15. A non-transitory storage medium storing a computer program to manage digital rights of content based on trusted relationships between a trusted agent and a service provider, the computer program comprising executable instructions that cause a computer to:
tag the content as using encryption;
specify a retrieval method that is used to request a decryption key so that the content is live streamed to a client device;
transmit an affiliation token to the trusted agent,
wherein the affiliation token represents a linkage of trust between the trusted agent and the service provider,
wherein the trusted agent attaches further information about the client device including an identifier to the affiliation token, wherein the service provider can use the information to enhance other business opportunities with a client, and
wherein the trusted agent relays the affiliation token onto the client device based on requirement and the identifier of the client device;
receive a request from the client device for the decryption key, which includes a value from the affiliation token to identify the trusted relationships; and
verify the request and providing the decryption key to the client device, wherein the client device uses the decryption key to decrypt the live streaming content for a playback.

16. The non-transitory storage medium of claim 15, wherein the retrieval method comprises an appropriate hypertext transfer protocol (HTTP) method to acquire the decryption key so that the content is live streamed to the client device.

17. The non-transitory storage medium of claim 15, further comprising executable instructions that cause a computer to upload the content to a content server for live streaming of the content to the client device.

18. The non-transitory storage medium of claim 15, wherein executable instructions that cause a computer to verify the request comprises executable instructions that cause a computer to
validate the client device through the affiliation token value.

19. The non-transitory storage medium of claim 15, wherein executable instructions that cause a computer to verify the request comprises executable instructions that cause a computer to
confirm that the client device is using the retrieval method as specified in the affiliation token.

\* \* \* \* \*